April 1, 1969 L. L. BLANE 3,436,483
RECORDED TELEPHONE DICTATION TRUNK CIRCUIT
Filed Feb. 26, 1965
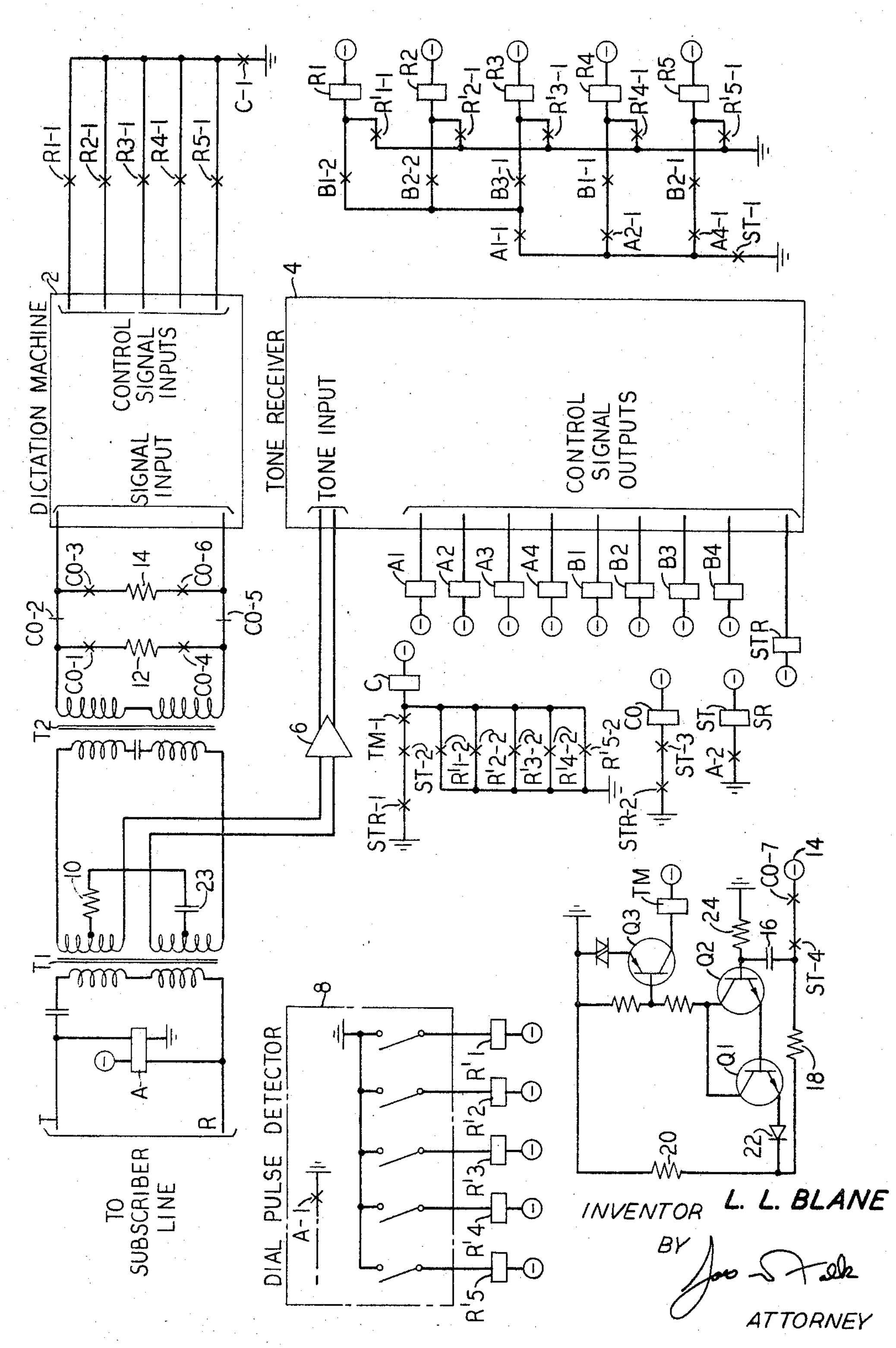
INVENTOR L. L. BLANE
BY Joe S. Falk
ATTORNEY United States Patent Office 3,436,483

Patented Apr. 1, 1969

3,436,483

RECORDED TELEPHONE DICTATION TRUNK CIRCUIT

Leslie L. Blane, Rumson, N.J., assignor to Bell Telephone Laboratories, Incorporated, New York, N.Y., a corporation of New York Filed Feb. 26, 1965, Ser. No. 435,519
Int. Cl. H04m *11/10;* G11b *5/06*
U.S. Cl. 179—6 11 Claims

ABSTRACT OF THE DISCLOSURE

A recorded telephone dictation trunk circuit is disclosed in which the dictation machine is disconnected from the subscriber line a predetermined time after a control signal is received indicating a control operation to be performed on the machine. However, additional delay circuitry requires that the control signal continue for a further period of time before a command is actually applied to the machine. The signal from the subscriber received over the trunk circuit may be either a tone or dial pulse.

This invention relates to recorded telephone dictation systems and more particularly to recorded telephone dictation trunk circuits equipped to handle tone signals.

A recorded telephone dictation trunk circuit generally interconnects three basic functional units. The first is the dictator's telephone set from which are transmitted, over the telephone line and switching network, the message to be recorded and the control signals for operating the dictation machine. In conventional systems the control signals are dial pulse digits, each digit controlling a different function of the dictating machine. The second unit is the dictation machine itself. The message transmitted to the trunk circuit is directed to the machine where it is recorded. The third unit is the digit detector which is also connected to the dictator's telephone line or incoming trunk and serves to identify the control digits received. The detector then causes the dictation machine to operate in accordance with the particular digits transmitted over the telephone line.

Tone signals are finding increasingly widespread use in telephone systems as a substitute for dial pulses. For this reason to be compatible with the more recently developed telephone subsets a recorded telephone dictation trunk circuit must be equipped to handle tone signals as well as dial pulses. A particular problem exists however which must be solved before tone signals may be used for recorded telephone dictation purposes.

While the subscriber is dictating the telephone line is connected through the trunk circuit to the dictation machine. To change the machine operation, e.g., to stop it, the subscriber controls the transmission of a tone to the tone receiver, the latter being connected in parallel with the dictation machine to the subscriber line. While the receiver can detect the tone and appropriately operate the dictation machine there is necessarily a time delay between the transmission of the tone and the operation of the receiver. During this time interval the tone is recorded by the dictation machine.

The subscriber is often allowed to control playback by the transmission of a specified tone or digit. During playback the tone previously transmitted by the subscriber and recorded on the machine is played back and directed to the subscriber. This in itself is of little consequence since at most the subscriber merely hears an instantaneous burst of tone, in the order of milliseconds in duration. However, the tone played back is also directed to the tone receiver since the line, receiver, and dictation machine are all interconnected. If the receiver is unable to distinguish between "legitimate" tones transmitted by the subscriber and "false" tones recorded on the dictation machine and played back, the tones recorded by the machine will be treated by the receiver as legitimate signals during playback. If there is no way to distinguish between legitimate signals and recorded signals each tone signal transmitted by the subscriber will in effect control two operations, the first as desired when the tone is first transmitted and the second when the recording is played back to the subscriber if the subscriber controls the playback operation.

This problem does not arise with dial pulse control. The dial pulses may be filtered out before reaching the dictation machine, e.g., by transformer windings, and are therefore not recorded in the first place. Tone signals may not be filtered out in this manner however if their frequency spectrum is within the voice band.

It is a general object of this invention to provide an improved recorded telephone dictation trunk circuit which is equipped to handle tone signals and is capable of distinguishing between legitimate tone signals received from the dictator and recorded tone signals transmitted back to the dictator during playback.

Briefly, in accordance with an aspect of our invention the tone receiver is connected directly to the subscriber line and operates when both legitimate signals are received from the subscriber and recorded tones are played back to the subscriber. However while the receiver detects the tone and determines the appropriate required function for the dictation machine the receiver does not directly control the machine operation.

When the receiver first operates two events occur. The first is that the subscriber line is disconnected from the dictation machine. Accordingly, while a legitimate tone signal is recorded by the dictation machine until the receiver operates, after the receiver operates the tone is no longer recorded. The second event is the initiation of a time-out cycle. The time-out is completed if the tone is continuously detected by the receiver for a predetermined time interval after the receiver first operates. Only after the time-out is completed is the dictation machine controlled in accordance with the signal detected by the tone receiver.

The circuit operation is as follows. If a legitimate tone signal is received the receiver operates after a first time interval, e.g., 40 milliseconds. The operation of the receiver in turn controls the initiation of the time-out cycle and the release of the dictation machine from the telephone line. A second time period, e.g., 20 milliseconds elapses between the operation of the receiver, and the initiation of the time-out cycle and the release of the line-machine connection. Thus 60 milliseconds of the legitimate tone signal are recorded by the machine. The time-out requires a third time interval, e.g., 40 milliseconds. If the tone is received from the subscriber for this additional time period the time-out is completed and the receiver is enabled to operate the dictation machine in accordance with the command represented by the transmitted tone. Thus when a legitimate tone is received from the subscriber the receiver operates the dictation machine after the tone is received for 100 milliseconds. However, only 60 milliseconds of the tone are recorded by the machine.

During playback the previously recorded tone on the machine is transmitted to the dictator and to the tone receiver as well. After 40 milliseconds the receiver operates as usual. After the additional 20 milliseconds the time-out cycle begins and the dictation machine is disconnected from the subscriber line. However, just when this action occurs the tone signal is no longer transmitted from the dictation machine to the subscriber line. This is due both to the fact that only 60 milliseconds of tone are recorded on the machine to begin with, and the fact that the dictation machine is no longer connected to the subscriber line and tone receiver. Consequently the time-out is not completed and the dictation machine is immediately reconnected to the subscriber line. The period during which the dictation machine is disconnected from the subscriber line is inconsequential. It is not even necessary that the dictation machine be disconnected from the line during playback. In fact, in many cases the machine will not be disconnected from the line at all since an attempt to break the connection is made at the same time that tone from the machine ceases. In such cases continuous transmission is provided during playback. Even if the connection is not broken erroneous operation is precluded. Because the tone from the machine ceases after 60 milliseconds the time out of 40 milliseconds is not terminated—the time-out begins just when the tone received by the tone receiver stops. Since the time-out is not completed the receiver is unable to control the dictation machine operation after the additional 40 milliseconds. The receiver, while operating from both legitimate signals and recorded signals, thus controls the machine operation only when legitimate signals are received.

It is a feature of this invention to provide in a recorded telephone dictation trunk circuit, in which a tone receiver responds indiscriminately to both legitimate tones transmitted from a dictator and tones previously recorded on the dictation machine, means for disconnecting the dictation machine from the dictator's line when the tone receiver first operates.

It is another feature of this invention to provide a time-out circuit whose cycle is initiated with the operation of the tone receiver and whose time-out is terminated only if a tone is detected by the receiver for an additional predetermined time interval after the receiver first operates.

It is another feature of this invention to enable the receiver to control the dictation machine operation in accordance with the tone detected only after the termination of the time-out cycle.

It is still another feature of this invention to provide in a recorded telephone dictation trunk a dial pulse detector for by-passing the tone receiver and time-out circuit and for operating the dictation machine in accordance with dial pulses transmitted from the dictator if the dictator transmits dial pulses rather than tone signals to control the operation of the dictation machine.

Further objects, features and advantages of the invention will become apparent upon consideration of the following detailed description in conjunction with the drawing which depicts an illustrative embodiment of our invention.

Referring to the drawing it will be noted that the dictation machine 2 and tone receiver 4 are shown only symbolically. Numerous circuits well known in the art may be used for each of these elements. The dictation machine includes two signal input conductors, which are connected through various transformer windings to a subscriber line. The voice signal from the dictator as well as the playback signal transmitted to him appear on the signal input conductors. The dictation machine also includes five control signal inputs. A ground signal on any one of these conductors controls a respective function of the machine such as record, playback, stop, etc.

The tone receiver 4 includes two tone input conductors. The tone signal from the dictator after being transmitted through transformer T1 and amplified by amplifier 6 is applied to the receiver. If the tone is received continuously for 40 milliseconds the receiver controls the application of ground potential to the winding of one of relays A1–A4, the winding of one of relays B1–B4, and the winding of relay STR. Consequently, after 40 milliseconds three delays operate simultaneously, relay STR, one of relays A1–A4, and one of relays B1–B4. The operated two of relays A1–A4 and B1–B4 remain operated for approximately 45 milliseconds. Relay STR remains operated as long as tone is present on the input conductors and releases immediately when the tone ceases, i.e., in less than a millisecond.

One of the control signal inputs of the dictation machine is grounded when the respective pair of contacts R1–1 through R5–1 are closed along with contacts C–1. Relays R1 through R5 may be operated by either relays A1 through B4, controlled by tone receiver 4, or relays R'1 through R'5, controlled by dial pulse detector 8. When a subscriber line is connected to the trunk circuit direct current flows through the tip and ring conductors and relay A operates. Contacts A–2 are closed and slow-release relay ST is operated. Contacts ST–1 are closed and connect ground potential through a pair of contacts, controlled by tone receiver 4, to the winding of one of relays R1 through R5. For example, if tone receiver 4 operates relays A1 and B1, ground potential is extended through contacts ST–1, A1–1 and B1–2 to the winding of relay R1 and this relay operates. If relays A4 and B2 are operated relay R5 is energized, etc. It will be noted that relays A3 and B4 are not required for controlling the operations of relays R1 through R5. A typical tone receiver responds to ten different tones representing the digits 0 through 9. There are fewer than 10 digits which may control the dictation machine operation and consequently some of the tone receiver outputs are not required in the recorded telephone dictation trunk.

If the dictator transmits dial pulses rather than tone signals to control the dictation machine operation, relay A follows them. Contacts A–1 in dial pulse detector 8 successively open and close. The dial pulse detector may be any of many circuits well known in the art. The operation of the detector is shown only symbolically by the switches included in it. When a complete digit is received one of relays R'1 through R'5 is energized. Consequently, one pair o contacts R'1—1 through R'5—1 are closed and one of respective relays R1 through R5 is operated. Thus one pair of contacts R1–1 through R5–1 are closed. The winding of relay C is connected to ground through one pair of contacts R'1–2 through R'5–2 and relay C is operated. Contacts C–1 are closed and ground potential is extended to one of the control signal inputs of the dictation machine. Thus if dial pulses are transmitted from the dictator, ground potential is applied to the appropriate dictation machine signal input without requiring the operation of tone receiver 4; one of relays R'1 through R'5, one of relays R1 through R5, and relay C operate as soon as the dialed digit is detected. When tone signals are transmitted however the tone must be received for 40 milliseconds before two of relays A1 through B4 operate, followed by the operation of one of relays R1 through R5. Even when one of these latter relays operates however the respective control signal input of the dictation machine is not grounded because contacts C–1 are open. These contacts close only after the additional time-out interval of 40 milliseconds has elapsed.

Before proceeding with the description of the time-out sequence and the operation of the cut-off relay CO, certain remarks might be made concerning the connections to transformers T1 and T2. Resistor 10 and capacitor 23 are provided for balancing purposes. When contacts CO–2 and CO–5 are open the dictation machine is not connected to transformer T2. Contacts CO–1 and CO–4 are closed and the impedance of resistor 12 is reflected back toward the line. This reflected impedance together with resistor 10 and capacitor 23 provide the proper termination for the line. Resistor 14 is provided to terminate the signal input terminals of the dictation machine when relay CO is operated. When relay CO is unoperated the tone from the subscriber line is transmitted through transformer T1 to both transformer T2 and the dictation machine, and amplifier 6. Due to the attenuation introduced by transformer T1 the level of the tone may be insufficient to operate the receiver. Accordingly, amplifier 6 is included in the circuit. While transformers T1 and T2 also attenuate the signal to the dictation machine, standard dictation machines in present use include input amplification and for this reason additional amplification between the line and the dictation machine is not required in the trunk circuit. It should also be noted that during playback transformer T1 greatly attenuates the tone transmitted from the machine through amplifier 6 to the tone receiver. However, the relatively high attenuation in this direction may still be insufficient, especially due to the inclusion of amplifier 6, to prevent the erroneous operation of the receiver during playback. For this reason the time-out circuit is included.

When a legitimate tone is received from the dictator the appropriate windings of relays A1 through B4, together with the winding of relay STR, are grounded. These relays require approximately ten milliseconds to operate. Thus contacts STR–2 close after the tone has been received for 50 milliseconds. Contacts ST–3 are closed since relay ST operates when the trunk circuit is first seized and when contacts STR–2 close relay CO operates. This relay also requires approximately ten milliseconds to operate and consequently the various contacts on this relay switch states after the tone is received for 60 milliseconds. The energization of relay CO controls two functions. First, the dictation machine is disconnected from the line. Contacts CO–2 and CO–5 open. Instead of the dictation machine being connected to the line it is terminated by resistor 14 through closed contacts CO–3 and CO–6. Contacts CO–1 and CO–4 enable resistor 12 together with resistor 10 and capacitor 23 to terminate the subscriber line. Since contacts CO–2 and CO–5 open after the tone has been received for 60 milliseconds only 60 milliseconds of tone are recorded by the dictation machine.

The second function controlled by the energization of relay CO is the initiation of the time-out cycle. Contacts ST–4 are closed with the initial operation of relay ST and when contacts CO–7 close the time-out begins. Initially there is no charge across capacitor 16. When the contacts close and voltage source 14 is connected to the capacitor the full potential of the source appears at the base of transistor Q2 since the voltage across the capacitor cannot change instantaneously. Resistors 18 and 20 form a voltage divider network and thus the cathode of diode 22 is at a less negative potential than the potential of source 14. Consequently the base-emitter junctions of transistors Q1 and Q2 remain reverse biased and these transistors remain off.

Capacitor 16 charges from source 14 through resistor 24. After 40 milliseconds the base of transistor Q2 is positive with respect to the cathode of diode 22; transistors Q1 and Q2 turn on. The base of transistor Q3, originally at ground potential, is now held at a negative potential. Transistor Q3 becomes saturated and the current through it energizes relay TM. Relay TM remains operated until contacts ST–4 or CO–7 release.

Thus 100 milliseconds after the tone is first received transistor Q3 turns on. Relay TM requires ten milliseconds to operate and consequently contacts TM–1 close 110 milliseconds after the tone is first received. Since contacts STR–1 and ST–2 are closed, relay C energizes. Contacts C–1 close and ground potential is extended through the selected pair of closed contacts R1–1 through R5–1 to the dictation machine. Relay C requires ten milliseconds to operate and thus the control signal is sent to the dictation machine 120 milliseconds after the tone is first received. The tone must persist for 100 milliseconds for the control signal to be transmitted. All of the relays in the circuit, except ST, release in less than a millisecond. Thus if the tone ceases before 100 milliseconds have elapsed relay STR releases instantaneously and when contacts STR–2 open relay CO releases. Contacts CO–7 thus open almost instantaneously when the tone ceases and relay TM does not operate. However if the tone is received for 100 milliseconds transistors Q1, Q2 and Q3 conduct. Although the tone must be received for 100 milliseconds in order for the control signal to be directed to the dictation machine only 60 milliseconds of tone are recorded by the machine because contacts CO–2 and CO–5 open after the tone has been received for 60 milliseconds.

Because only 60 mlliseconds of tone are recorded a false control signal is not transmitted to the dictation machine during playback. To control playback the dictator transmits the appropriate tone for 100 milliseconds. The respective one of relays R1 through R5 energizes and the playback control signal is sent to the dictation machine. During playback a point may be reached where 60 milliseconds of tone are recorded. The tone is transmitted through transformer T2 and the rightmost windings of transformer T1 to amplifier 6 and tone receiver 4. After 40 milliseconds the appropriate two of relays A1 through B4 operate together with relay STR. Contacts STR–2 close after 50 milliseconds to operate relay CO, and contacts CO–7 close after 60 milliseconds to initiate the time-out cycle. At the same time contacts CO–1 through CO–6 attempt to change state to disconnect the dictation machine from the subscriber line. However at just this time the 60 milliseconds of tone ceases and relays STR and CO immediately release. Thus the time-out cycle barely begins, relays TM and C do not operate, and no control signal is transmitted to the dictation machine. Contacts CO–1 through CO–6 immediately revert to the states shown in the drawing to connect the dictation machine to the subscriber line. The break in the playback is hardly noticeable to the dictator. The two operated ones of relays A1 through B4 release after 45 milliseconds. While the two operated relays remain energized for 45 milliseconds and the respective one of relays R1 through R5 is operated, since contacts C–1 are open no control signal is transmitted to the dictation machine.

The invention has been described with reference to a particular embodiment. Many variations are possible. For example, the tone receiver may operate instantaneously rather than after a delay of 40 milliseconds. In such a case the dictation machine could be disconnected from a subscriber line very soon after the tone is first received and only a burst of tone would be recorded by the machine. Again, the operation of relay C would be delayed until it is determined that a legitimate tone signal has been received from the dictator rather than a burst of tone recorded by the machine and transmitted back during playback. Thus it is to be understood that numerous modifications may be made in the illustrative embodiment of the invention and other arrangements may be devised without departing from the spirit and scope of the invention.

What is claimed is:

1. A recorded telephone dictation trunk circuit for interconnecting a telephone line, a tone receiver and a dictation machine comprising amplifying means for connecting said line to said receiver, swtching means for connecting said line to said dictation machine, relay means operative responsive to the detection by said receiver of a tone on said line for a first predetermined time interval, means responsive to the operation of said relay means for controlling said switching means to disconnect said line from said dictation machine, and means responsive to the detection of said tone by said receiver for a second predetermined time interval after the operation of said relay means for controlling the operation of said dictation machine in accordance with the frequency content of the tone detected by said receiver.

2. A recorded telephone dictation trunk circuit in accordance with claim 1 further including means for detecting dial pulses transmitted over said telephone line, and means responsive to said dial pulse detecting means for controlling the operation of said dictation machine in accordance with the number of dial pulses detected by said detecting means.

3. A recorded telephone dictation trunk circuit for interconnecting a telephone line, a tone receiver and a dictation machine comprising amplifying means for connecting said line to said receiver, switching means for connecting said line to said dictation machine, means responsive to the detection by said receiver of a tone on said line for a first predetermined time interval for controlling said switching means to disconnect said line from said dictation machine, and means responsive to the detection of said tone by said receiver for a second predetermined time interval following said first predetermined time interval for controlling the operation of said dictation machine in accordance with the frequency content of the tone detected by said receiver.

4. A recorded telephone dictation trunk circuit for controlling the operation of a dictation machine in accordance with tone signals transmitted over a telephone line comprising means for connecting said line to said dictation machine, means responsive to the transmission of a tone on said line for a first predetermined time interval for controlling said connecting means to disconnect said line from said dictation machine, and means responsive to the transmission of said tone on said line for a second predetermined time interval following said first predetermined time interval for controling the operation of said dictation machine in accordance with the frequency content of said transmitted tone.

5. A recorded telephone dictation trunk circuit in accordance with claim 4 further including means responsive to the transmission of dial pulses on said telephone line for controlling the operation of said dictation machine in accordance with said dial pulses independent of the transmission of a tone on said line.

6. A recorded telephone dictation trunk circuit in accordance with claim 4 wherein one of the operations of said dictation machine is playback and further including a tone receiver connected to said line for detecting the transmission of said tone for said first and second predetermined time intervals, and means for attenuating the level of the tone detected by said tone receiver when a recorded tone is transmitted from said dictation machine to said line during a playback operation.

7. A recorded telephone dictation trunk circuit in accordance with claim 4 further including means for separately terminating said telephone line and said dictation machine when said connecting means disconnects said telephone line from said dictation machine.

8. A control circuit for use with a source of information and tone signals and a recording machine comprising means for connecting said source to said recording machine, means responsive to the transmission of a tone signal from said source to said recording machine for a first predetermined time interval for controlling said connecting means to disconnect said source from said recording machine, and means responsive to the transmission of said tone signal for a second predetermined time interval following said first predetermined time interval for controlling the operation of said recording machine in accordance with the frequency content of said transmitted tone signal.

9. A control circuit for use with a source of information and tone signals and a recording machine comprising means for connecting said source to said recording machine, said machine including a playback mode of operation for playing back the recorded information and tone signals to said source, detecting means responsive to the transmission of a tone signal through said connecting means for controlling the operation of said recording machine in accordance with the frequency content of said tone signal, and means for enabling said detecting means to be responsive only to tone signals transmitted from said source to said recording machine, said last-mentioned means including means for causing said connecting means to disconnect said source from said recording machine when a tone signal has been transmitted through said connecting means for a time interval smaller than the time interval required for the operation of said detecting means.

10. A control circuit for use with a source of information and control signals and a recording machine comprising means for connecting said source to said recording machine, said machine including a playback mode of operation for playing back the recorded information and control signals to said source, detecting means responsive to the transmission of a control signal through said connecting means for controlling the operation of said recording machine in accordance with the particular control signal transmitted, and means for enabling said detecting means to be responsive only to control signals transmitted from said source to said recording machine, said last-mentioned means including means for controlling said recording machine to stop recording when a control signal has been transmitted through said connecting means for a time interval smaller than the time interval required for the operation of said detecting means.

11. A control circuit for use with a transmitting signal source and a connected recording machine comprising detecting means responsive to the transmission of a signal from said source for controlling the operation of said machine in accordance with the particular signal transmitted, means for inhibiting said recording machine from recording a transmitted signal after said signal is detected, and means, distinct from the inhibiting means, for delaying the operation of said machine in accordance with the transmitted signal until after the operation of said inhibiting means.

References Cited

UNITED STATES PATENTS

| | | | |
|---|---|---|---|
| 3,286,273 | 11/1966 | Von Kohorn | 179—100.2 X |
| 2,949,502 | 8/1960 | Logan | 179—6 |

BERNARD KONICK, *Primary Examiner.*

RAYMOND F. CARDILLO, Jr., *Assistant Examiner.*

U.S. Cl. X.R.

179—100.1